(12) United States Patent
Schwarz et al.

(10) Patent No.: US 10,982,595 B2
(45) Date of Patent: Apr. 20, 2021

(54) HEAT EXCHANGER FOR GAS TURBINE ENGINE MOUNTED IN INTERMEDIATE CASE

(71) Applicant: UNITED TECHNOLOGIES CORPORATION, Farmington, CT (US)

(72) Inventors: Frederick M. Schwarz, Glastonbury, CT (US); Paul W. Duesler, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 938 days.

(21) Appl. No.: 15/244,025

(22) Filed: Aug. 23, 2016

(65) Prior Publication Data

US 2018/0058328 A1 Mar. 1, 2018

(51) Int. Cl.
*F02C 7/141* (2006.01)
*F02C 7/18* (2006.01)
*F02C 9/18* (2006.01)

(52) U.S. Cl.
CPC ............. *F02C 7/141* (2013.01); *F02C 7/18* (2013.01); *F02C 7/185* (2013.01); *F02C 9/18* (2013.01); *F05C 2201/90* (2013.01); *F05D 2260/213* (2013.01); *F05D 2300/176* (2013.01); *F05D 2300/1723* (2013.01); *Y02T 50/60* (2013.01)

(58) Field of Classification Search
CPC ...... F02K 3/02; F02C 6/08; F02C 7/18; F02C 7/185; F02C 9/18; F05D 2260/213
See application file for complete search history.

(56) References Cited

U.S. PATENT DOCUMENTS

| 4,231,704 A | 11/1980 | Ayache et al. |
| 4,332,133 A | 6/1982 | Schwarz et al. |
| 5,203,163 A | 4/1993 | Parsons |

(Continued)

FOREIGN PATENT DOCUMENTS

EP 3232032 A1 10/2017

OTHER PUBLICATIONS

Extended European Search Report for European Application No. 17187143.7 dated May 15, 2018.

(Continued)

*Primary Examiner* — Ehud Gartenberg
*Assistant Examiner* — Henry Ng
(74) *Attorney, Agent, or Firm* — Carlson, Gaskey & Olds, P.C.

(57) ABSTRACT

A gas turbine engine has a compressor section including a lower pressure compressor and a higher pressure compressor, and a turbine section. A core engine housing surrounds the compressor section and the turbine section. An outer intermediate housing wall defines an internal chamber between the core housing and the outer intermediate housing. A fan rotor and a fan casing surround the fan rotor to define a bypass duct between the fan case and the outer intermediate housing. A heat exchanger is mounted in the internal chamber and receives high pressure air for cooling the high pressure air and delivering the high pressure air into the core engine housing to be utilized as cooling air for a component. Air from the lower pressure compressor is utilized to cool the higher pressure air in the heat exchanger.

1 Claim, 3 Drawing Sheets

(56) References Cited

U.S. PATENT DOCUMENTS

| | | | |
|---|---|---|---|
| 5,269,133 A * | 12/1993 | Wallace | F02C 7/185 |
| | | | 165/142 |
| 5,358,374 A * | 10/1994 | Correia | F01D 5/081 |
| | | | 415/115 |
| 5,392,614 A | 2/1995 | Coffinberry | |
| 7,555,905 B2 * | 7/2009 | Borcea | F02C 6/08 |
| | | | 215/279 |
| 8,408,009 B2 | 4/2013 | Blanchard et al. | |
| 8,448,448 B2 | 5/2013 | Blanchard et al. | |
| 8,893,512 B2 | 11/2014 | Donahoo et al. | |
| 8,920,128 B2 | 12/2014 | Matwey et al. | |
| 9,062,605 B2 | 6/2015 | Roussely-Rousseau et al. | |
| 9,222,411 B2 | 12/2015 | Sennoun | |
| 2007/0071996 A1 * | 3/2007 | Hazel | C23C 30/00 |
| | | | 428/650 |
| 2012/0064813 A1 * | 3/2012 | Horner | B64D 13/02 |
| | | | 454/71 |
| 2013/0186102 A1 * | 7/2013 | Lo | F02C 7/18 |
| | | | 60/785 |
| 2013/0192239 A1 * | 8/2013 | Glahn | F01D 25/18 |
| | | | 60/772 |
| 2015/0114611 A1 | 4/2015 | Morris et al. | |
| 2016/0169109 A1 * | 6/2016 | Liu | F04D 29/522 |
| | | | 60/782 |
| 2016/0281532 A1 * | 9/2016 | Rambo | F28F 1/26 |

OTHER PUBLICATIONS

Partial European Search Report for European Application No. 17187143.7 dated Jan. 24, 2018.

* cited by examiner

HEAT EXCHANGER FOR GAS TURBINE ENGINE MOUNTED IN INTERMEDIATE CASE

BACKGROUND OF THE INVENTION

This application relates to a heat exchanger for providing cooling air in a gas turbine engine.

Gas turbine engines are known and typically include a fan delivering air into a bypass duct as propulsion air, and further providing air into a core housing. Air in the core housing passes into a compressor where it is compressed, and then into a combustor where it is mixed with fuel and ignited. Products of this combustion pass downstream over turbine rotors, driving them to rotate.

As is known, turbine components see very high temperatures and thus cooling air has been typically provided to those components. Historically, the fan and a low pressure compressor have rotated as a single unit along with a fan drive turbine. However, more recently, a gear reduction has been placed between the fan rotor and the fan drive turbine. This allows the fan rotor to rotate at slower speeds and the fan drive turbine to rotate at faster speeds. This increases the challenges on the turbine components and requires more efficient provision of the cooling air.

At the same time, the overall pressure ratio provided by the compressor has increased. Historically, the air to cool the turbine components has been tapped from a location downstream of a highest pressure location on the compressor. However, with the increase in overall pressure ratio, this air has become hotter.

The heat exchangers for cooling this air are thus subject to extreme challenges.

SUMMARY OF THE INVENTION

In a featured embodiment, a gas turbine engine has a compressor section including a lower pressure compressor and a higher pressure compressor, and a turbine section. A core engine housing surrounds the compressor section and the turbine section. An outer intermediate housing has a wall that defines an internal chamber between the core housing and the outer intermediate housing. A fan rotor and a fan casing surround the fan rotor to define a bypass duct between the fan case and the outer intermediate housing. A heat exchanger is mounted in the internal chamber and receives high pressure air for cooling the high pressure air and delivering the high pressure air into the core engine housing to be utilized as cooling air for a component. Air from the lower pressure compressor is utilized to cool the higher pressure air in the heat exchanger.

In another embodiment according to the previous embodiment, a valve is selectively opened and closed to bleed air from the lower pressure compressor, and the valve being opened to provide air across the heat exchanger for cooling the higher pressure air.

In another embodiment according to any of the previous embodiments, the valve is controlled to be partially open at a takeoff condition.

In another embodiment according to any of the previous embodiments, the bleed valve is controlled to be moved towards a closed position at lower power operation.

In another embodiment according to any of the previous embodiments, the lower power operation includes idle operation.

In another embodiment according to any of the previous embodiments, the heat exchanger is formed of elongated members having fins on an outer surface.

In another embodiment according to any of the previous embodiments, the elongated members extend radially outwardly to an elbow which takes the higher pressure air radially outwardly to the elbow and a second elongated member returns the higher pressure air radially inwardly into a housing for the engine.

In another embodiment according to any of the previous embodiments, the valve is controlled to be moved towards a closed position at low power operation wherein power is lower than take off.

In another embodiment according to any of the previous embodiments, the lower power operation includes idle operation.

In another embodiment according to any of the previous embodiments, the heat exchanger is formed of elongated members having fins on an outer surface.

In another embodiment according to any of the previous embodiments, the elongated members extend radially outwardly to an elbow which takes the higher pressure air radially outwardly to the elbow and a second elongated member returns the higher pressure air radially inwardly into a housing for the engine.

In another embodiment according to any of the previous embodiments, the valve is a bleed valve controlled to lower a load on the compressor section.

In another embodiment according to any of the previous embodiments, the higher pressure air is tapped from an outer chamber surrounding a combustor.

In another embodiment according to any of the previous embodiments, the heat exchanger is formed of elongated members having fins on an outer surface.

In another embodiment according to any of the previous embodiments, the elongated members extend radially outwardly to an elbow which takes the higher pressure air radially outwardly to the elbow and a second elongated member returns the higher pressure air radially inwardly into a housing for the engine.

In another embodiment according to any of the previous embodiments, the heat exchanger is formed of a superalloy material typically utilized for turbine components.

In another embodiment according to any of the previous embodiments, the heat exchanger is formed of a cast nickel alloy material.

In another embodiment according to any of the previous embodiments, the cast nickel alloy material includes more than 50-percent per volume gamma-prime ($Y^1$).

These and other features may be best understood from the following drawings and specification.

DETAILED DESCRIPTION

Figure 1:
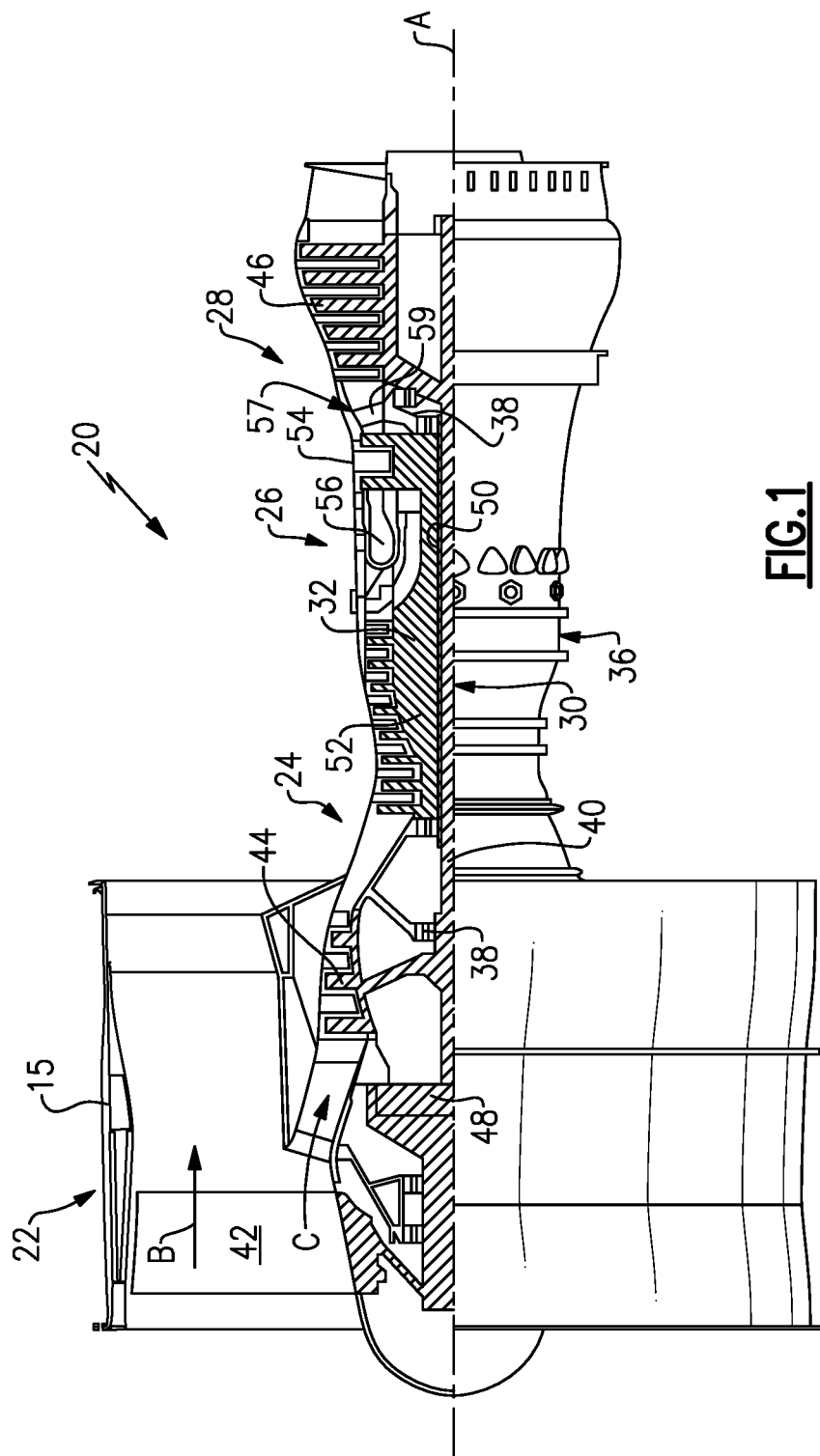
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
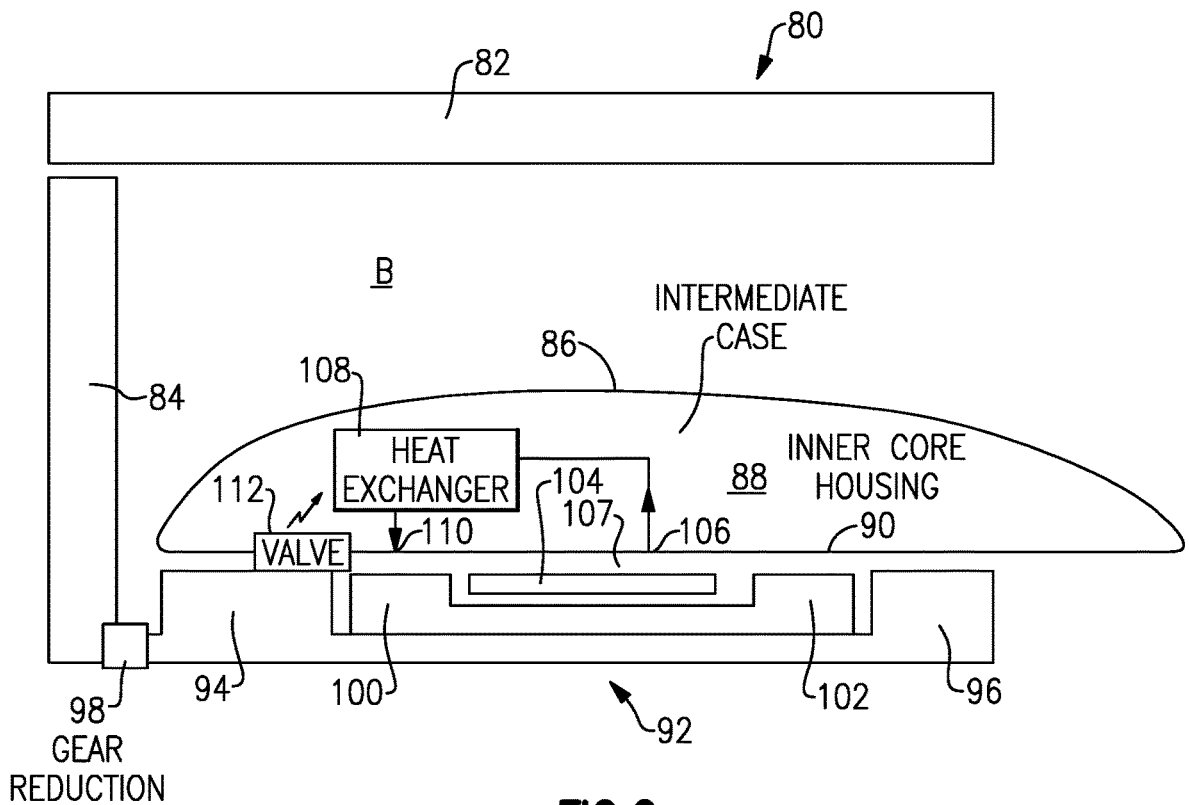
FIG. 2 schematically shows a cooling system.

As shown in FIG. 2, an engine 80 has an outer fan case 82 surrounding a fan rotor 84. An intermediate case 86 defines a chamber 88 with an inner core engine housing 90. As known, a bypass duct B is defined between the intermediate case 86 and fan case 82. The core engine 92 includes a low pressure compressor 94 being driven by a low pressure turbine 96. The low pressure turbine 96 may also drive the fan rotor 84 through a gear reduction 98. A high pressure compressor 100 is driven by a high pressure turbine 102. A combustor 104 is positioned intermediate the high pressure compressor 100 and high pressure turbine 102.

As known, there is a need for cooling air. Thus, air at a high temperature is tapped at 106 such as from a diffuser case 107 surrounding the combustor 104. This is air from a location downstream of the high pressure compressor 100 and thus it will be at a high pressure such that it can move to the turbine section to provide cooling.

The air is passed through a heat exchanger 108 where it is cooled by air from the low pressure compressor 94 as will be explained. The air is then delivered through an inlet 110 to pass radially inwardly and to the high pressure turbine 102.

Figure 3:
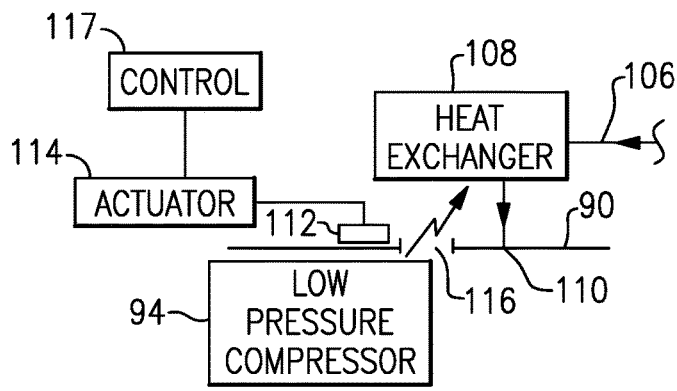
FIG. 3 shows a detail of the cooling system.

A valve 112 is shown in detail in FIG. 3 controlled by an actuator 114. Valve 112 is moved away from an opening 116 to allow air from the low pressure compressor 94 to pass across the heat exchanger 108 and cool the air in the heat exchanger 108 before being delivered to the inlet 110.

The valve 112 may be a bleed valve which is selectively opened dependent on a condition of an engine to reduce the load on the compressor. As an example, at idle, the valve 112 may be opened.

On the other hand, in this disclosure, since that air is used for cooling the heat exchanger 108, certain control features of valve 112 are changed. Thus, a control 117 for the actuator 114 is programmed to move the valve 112 to positions to ensure there will be airflow across the heat exchanger 108 when needed. As an example, at lower power operation, such as idle, the cooling of the heat exchanger 108 may not be important. However, at high power operation, such as take off, cooling is important. That is, bleed valve 112 is opened at idle to reduce the load on the compressor. This valve is also utilized to provide air across a heat exchanger at higher power operation. Typically the bleed valve would not have been opened at higher power operation.

Thus, while the bleed valve 112 has typically been closed at takeoff in the past, the control 117 will control the actuator 114 such that the valve 112 is at least partially open at takeoff to ensure the flow of cooling air.

Figure 4:
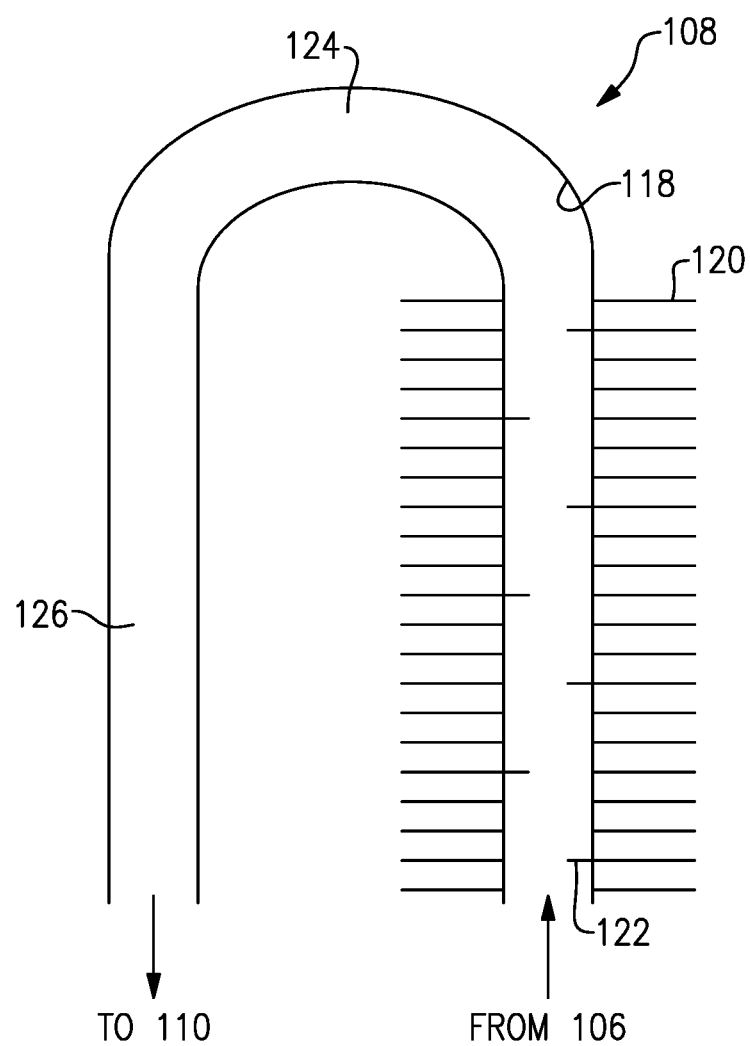
FIG. 4 shows a detail of a heat exchanger.

FIG. 4 shows an embodiment of the heat exchanger 108. Air from tap 106 passes into a tube 118. The tube 118 is provided with fins 120. Further, trip strips or other turbulence causing structures 122 may be formed on an inner wall of the tube 118. The tube 118 is preferably relatively short, as radially outer locations will provide less efficient cooling than radially inner locations.

The air reaches an elbow 124 and then returns inwardly through another tube 126 which may also be provided with fins and trip strips, if desired. That air returns to 110.

In embodiments, the heat exchanger tubes 118, 126, elbow 124, and optionally the fins 120 and trip strips 122 may be formed of a superalloy material typically utilized for turbine components. In particular, a cast nickel alloy material including more than 50-percent by volume gamma-prime (Y'). Intermetallic phase material may be utilized as the Y' material. The intermetallic phase material may be $Ni_3AL$ or $Ni_3TI$ as examples.

Such a heat exchanger is disclosed in co-pending application Ser. No. 15/138,491, and entitled Simple Heat Exchanger Using Super Alloy Materials for Challenging Applications.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section including a lower pressure compressor and a higher pressure compressor, and a turbine section;
a core engine housing surrounding said compressor section and said turbine section, and
an outer intermediate housing having a wall defining an internal chamber between said core housing and said outer intermediate housing;
a fan rotor and a fan casing surrounding said fan rotor to define a bypass duct between said fan case and said outer intermediate housing, and a heat exchanger mounted in said internal chamber and receiving high pressure air for cooling said high pressure air and delivering said high pressure air into said core engine housing to be utilized as cooling air for a component;
air from said lower pressure compressor being utilized to cool the higher pressure air in said heat exchanger;
wherein a valve is selectively opened and closed to bleed air from said lower pressure compressor, and said valve being opened to provide air across said heat exchange for cooling said higher pressure air;
wherein said valve is controlled to be at least partially open at a takeoff condition;
wherein said valve is controlled to be moved towards a closed position at lower power operation but at least partially open at idle;
wherein said valve is a bleed valve controlled to lower a load on said compressor section;
wherein said heat exchanger is formed of elongated members having fins on an outer surface;
wherein said heat exchanger is formed of a cast nickel alloy material; and
wherein said cast nickel alloy material includes more than 50-percent per volume gamma-prime (Y').

* * * * *